United States Patent Office 2,930,709
Patented Mar. 29, 1960

2,930,709

INORGANIC BONDED CORES FOR STEEL CASTINGS

Cameron G. Harman, Cleveland, Ohio, assignor to Steel Founders' Society of America, a non-incorporated association No Drawing. Application January 2, 1958
Serial No. 706,548

2 Claims. (Cl. 106—38.9)

This invention relates to the preparation of improved cores for the casting of steel in molds. More particularly it relates to the preparation of cores characterized by a high strength after curing at moderate temperatures for short periods of time and also characterized by a low strength at elevated temperatures, whereby good shakeout of the cores is readily achieved.

Cores are one of the vital elements in the production of high quality castings. In general cores have been made from many widely differing compositions of refractory materials bonded by various bonding materials. Among the bonding materials which have been suggested are sodium silicate, clays, silica gels and organic materials too numerous to list. The silicates, silica gel and other inorganic materials tend to vitrify at the temperature at which the metal is cast and a portion of the core often burns into the skin of the finished casting. Organic binders decompose at the temperatures encountered and contribute to surface porosity in the finished casting. Hence the search for an ideal binder has continued to the present.

It has been discovered that cores which were free from many of the disadvantages associated with prior art binders could be prepared from sand bonded with an aqueous solution of sodium hexametaphosphate ($Na_6P_6O_{18}$) and containing a small amount of a refractory material whereby the action of the hexametaphosphate will be controlled.

It was found that cores formed of sand bonded with sodium hexametaphosphate alone were unsatisfactory because they had excessively high strengths when baked and hence did not shake out properly and because they experienced pyroplastic flow under pressure at temperatures as low as 1200° F. and hence tended to deform to some extent in use. Since the incorporation of even as little as 1% by weight of sodium hexametaphosphate into the sand imparted excellent workability to the sand, it appeared that if means could be found for overcoming the accompanying disadvantages an improved binder might be produced.

The hardening of cores prepared from Ottawa sand (GFN 47) and various proportions of aqueous solutions of $Na_6P_6O_{18}$ is shown in the following table:

TABLE I

| Minutes Baked at 140° C. (284° F.) | Compression Strength (p.s.i.) | | |
|---|---|---|---|
| | 4%[1] | 3%[1] | 1%[1] |
| 1 | 222 | 178 | 47 |
| 5 | 1,041 | 775 | |
| 10 | 1,429 | | |
| 15 | | 1,321 | |
| 30 | 1,443 | | |
| 60 | 1,461 | | |

[1] 1% designates that 1% by weight of a solution formed by mixing 45% of $Na_6P_6O_{18}$ with 55% of water was added to 99% by weight of Ottawa sand (GFN 47); 3% designates that 3% was added to 97% sand; and 4% designates that 4% by weight of solution was added to 96% by weight of sand.

The aforesaid mixtures possessed excellent molding properties and exhibited no tendency to adhere to or stick to the pattern or tools. Molded cores produced from the mixture had green strengths of approximately 4 p.s.i. and, as shown by the tabulated results, became stronger when heated in an oven at 140° C. (284° F.).

The addition of small, but nevertheless significant, amounts of suitable refractory materials profoundly modifies the strength of cores prepared from mixtures of sand and sodium hexametaphosphate, as will be evident from the following tables:

TABLE II

Baked strength (after cooling) of cylinders prepared from sand bonded with $Na_6P_6O_{18}$

| Baking Temperature, ° F. | Compressive Strength (p.s.i.), Room Temp. | | |
|---|---|---|---|
| | Mix A[1] | Mix B[2] | Mix C[3] |
| 300 | 373 | 527 | 359 |
| 600 | 318 | 254 | 162 |
| 900 | 64 | 172 | 238 |
| 1,200 | 1,434 | 279 | 91 |
| 1,500 | 2,147 | 1,477 | 130 |
| 1,800 | 970 | 2,034 | 104 |
| 2,100 | 811 | 1,524 | 28 |
| 2,400 | 165 | 1,328 | 9 |
| 2,700 | 0 | 111 | 0 |

[1] Mix A—98% quartz sand; 0.90% $Na_6P_6O_{18}$; 1.10% $H_2O$.
[2] Mix B—96% Ottawa sand; 1.10% $Na_6P_6O_{18}$; 1.96% $H_2O$; 0.94% South Carolina kaolin.
[3] Mix C—9.% Ottawa sand; 1.31% $Na_6P_6O_{18}$; 1.12% $H_2O$; 1.17% $ZrO_2$; 0.39% kaolin.

TABLE III

Compressive strength, while hot, of samples prepared from sand bonded with $Na_6P_6O_{18}$

| Temperature, ° F. | Compressive Strength, p.s.i. | |
|---|---|---|
| | Mix D[1] | Mix C[2] |
| 300 | 283 | 104 |
| 600 | 58 | 203 |
| 900 | 13 | 30 |
| 1,200 | 0 | 67 |
| 1,500 | 0 | 19 |
| 1,800 | 0 | 0 |
| 2,100 | 0 | 61 |
| 2,400 | 0 | 15 |
| 2,700 | 0 | 6 |

[1] Mix D—97% quartz sand (GFN 47); 1.35% of $Na_6P_6O_{18}$; 1.65% $H_2O$.
[2] Mix C—same as for table II.

The above data clearly shows that the addition of kaolin and zirconium oxide to the phosphate dissolved in water produced a binder with greatly improved strength properties. Both the zirconium oxide powder and the washed kaolin used had an average particle size of about 10 microns. The workability of sand mixtures in which varying amounts of binder up to 4% by weight were mixed with sand was found to be excellent. The cores produced formed well, had good edge characteristics and were not friable under slight pressure. They remained unchanged when stored for a week at ordinary room conditions. The cores also possessed high permeabilities. In the green state, as measured with a Dietert Permmeter, the value was 469. After baking at 500° F. for one hour the value was about 500. When cores were heated for 3 minutes at 140° C. (284° F.) the crushing strength was 96 p.s.i.

While the results above show that kaolin and zirconium oxide are suitable modifiers, other refractory additives are also effective. Suitable additives are those which do not react rapidly with sodium phosphate to form low melting sodium or phosphate compounds. I have found that various china clays, kaolins and fire clays are effective—particularly where used in combination with fine-grained, highly refractory oxides of the group including $Al_2O_3$, $Fe_2O_3$, $Cr_2O_3$, $ZrO_2 \cdot SiO_2$, $Al_2O_3 \cdot SiO_2$, and $3Al_2O_3 \cdot 2SiO_2$. These materials should have mean particle sizes in the range of 1 to 10 microns. Silica flour in particle sizes of the order of 10 microns is also effective.

Obviously the relative proportions of sand to additive will vary according to the intended end use. For cores of the type described, I have found that up to 4% of aqueous solutions of sodium polyphosphates and containing almost equal amounts of refractory additive, polyphosphate and water, were particularly effective.

I claim:

1. A core making composition composed of about 96% by weight of molding sand and about 4% by weight of a binder consisting essentially of about 33% by weight of $Na_6P_6O_{18}$, about 29% by weight of finely divided $ZrO_2$, having a particle size between 1 and 10 microns, about 10% by weight of finely divided kaolin, balance water.

2. A method of improving foundry cores for steel castings consisting essentially of at least about 96% by weight of molding sand bonded with between 1% and 4% by weight of an aqueous solution of sodium polyphosphate which comprises: modifying the sodium polyphosphate binder solution without decreasing the concentration of sodium polyphosphate in said solution below about 33% by weight of the total binder composition, by including in the aqueous binder solution a clay selected from the group consisting of china clays, kaolins, and fire clays and at least one fine-grained highly refractory oxide selected from the group consisting of zirconia, alumina, ferric oxide, chromic oxide, silica and zirconium silicate, said added materials having a particle size of between 1 and 10 microns, said clay constituting at least about 10% by weight of the total binder solution, and said clay and said fine-grained highly refractory oxide together constituting about one-third of the total binder solution, so modified.

References Cited in the file of this patent

UNITED STATES PATENTS

| | | |
|---|---|---|
| 1,872,876 | Bjorkstedt | Aug. 23, 1932 |
| 2,061,099 | Morgan | Nov. 17, 1936 |
| 2,383,812 | Navias | Aug. 28, 1945 |
| 2,479,504 | Moore et al. | Aug. 16, 1949 |
| 2,681,860 | Rhodes et al. | June 22, 1954 |
| 2,702,425 | Thompson | Feb. 22, 1955 |